US012591939B2

(12) United States Patent
Fu

(10) Patent No.: US 12,591,939 B2
(45) Date of Patent: Mar. 31, 2026

(54) METHOD FOR MONITORING OPERATION OF LIQUEFIED NATURAL GAS (LNG) STORAGE AND INTERNET OF THINGS SYSTEM (IoT) THEREOF

(71) Applicant: CHENGDU JIUGUAN SMART ENERGY TECHNOLOGY CO., LTD., Chengdu (CN)

(72) Inventor: Lin Fu, Chengdu (CN)

(73) Assignee: CHENGDU JIUGUAN SMART ENERGY TECHNOLOGY CO., LTD., Chengdu (CN)

( * ) Notice: Subject to any disclaimer, the term of this patent is extended or adjusted under 35 U.S.C. 154(b) by 317 days.

(21) Appl. No.: 18/464,316

(22) Filed: Sep. 11, 2023

(65) Prior Publication Data

US 2023/0419425 A1    Dec. 28, 2023

Related U.S. Application Data

(63) Continuation of application No. 18/321,766, filed on May 22, 2023, now Pat. No. 11,842,301.

(30) Foreign Application Priority Data

May 23, 2022    (CN) .......................... 202210563072.1
Apr. 20, 2023    (CN) .......................... 202310425941.9

(51) Int. Cl.
  *G06Q 50/06*        (2024.01)
  *G06Q 10/20*        (2023.01)
        (Continued)
(52) U.S. Cl.
  CPC ............. *G06Q 50/06* (2013.01); *G06Q 10/20* (2013.01); *G16Y 10/35* (2020.01);
        (Continued)

(58) Field of Classification Search
  CPC ........ G16Y 40/10; G16Y 40/20; G16Y 40/40; G16Y 10/35; H04L 63/0485; G06Q 50/06; G06Q 10/20
  See application file for complete search history.

(56) References Cited

U.S. PATENT DOCUMENTS 11,838,704 B1 * 12/2023 Fu ............................ H04Q 9/00
11,842,301 B1 * 12/2023 Fu .......................... G06Q 10/20
        (Continued)

FOREIGN PATENT DOCUMENTS

CN        104200113 A      12/2014
CN        108564254 A       9/2018
        (Continued)

OTHER PUBLICATIONS

First Office Action in Chinese Application No. 202210563072.1 mailed on Jun. 30, 2022, 28 pages.
        (Continued)

*Primary Examiner* — Charles G Freay
(74) *Attorney, Agent, or Firm* — METIS IP LLC

(57)        ABSTRACT

The present disclosure discloses a method for monitoring operation of liquefied natural gas (LNG) storage, comprising: acquiring operating data of an LNG storage device, physical and chemical parameters of LNG and historical pressure change data in the LNG storage device; determining pseudo data information based on the historical pressure change data; determining at least one set of pressure change data at at least one future time point through a pressure model based on the operating data, the physical and chemical parameters, the historical pressure change data, and the pseudo data information, wherein the pressure model is a machine learning model, the pressure model includes a feature extracting layer and a pressure layer; and determining a pressure adjusting time point and preparing for a (Continued)

100

Monitoring, by utilizing a data acquiring unit, an LNG storage device, and transmitting perception information after symmetric encryption to an LNG distributed energy management platform through an LNG distributed energy storage sensor network platform Decrypting, by the LNG distributed energy management platform, the encrypted perception information, performing an anomaly judgment on decrypted perception information according to a preset anomaly judgment condition, and performing a pseudo data verification on and labeling the abnormal perception information, performing an anomaly prediction analysis on operating data of the LNG storage device according to an early warning mechanism and an alarm Sending, by an LNG distributed energy storage maintenance personnel sensor network platform, an alarm prompt to field maintenance personnel for an inspection and processing according to a tank number of a storage device corresponding to the abnormal data obtained by the anomaly prediction analysis and anomaly judgment Performing, by the field maintenance personnel, a two-way maintenance confirmation with the LNG distributed energy management platform through the LNG distributed energy storage maintenance personnel sensor network after completing the inspection and processing to complete maintenance of the abnormal storage device pressure adjustment based on the at least one set of pressure change data at the at least one future time point.

20 Claims, 6 Drawing Sheets

(51) Int. Cl.

| | | |
|---|---|---|
| *G16Y 10/35* | (2020.01) | |
| *H04L 9/40* | (2022.01) | |
| *G16Y 40/10* | (2020.01) | |
| *G16Y 40/20* | (2020.01) | |
| *G16Y 40/40* | (2020.01) | |

(52) U.S. Cl.
CPC .......... *H04L 63/0485* (2013.01); *G16Y 40/10* (2020.01); *G16Y 40/20* (2020.01); *G16Y 40/40* (2020.01)

(56) References Cited

U.S. PATENT DOCUMENTS

| | | | | |
|---|---|---|---|---|
| 11,898,895 B2 * | 2/2024 | Shao | ........................ | G01F 25/15 |
| 11,935,000 B2 * | 3/2024 | Fu | ........................... | G16Y 10/35 |
| 12,154,072 B2 * | 11/2024 | Fu | ........................... | G06Q 10/08 |
| 2002/0026427 A1 | 2/2002 | Kon et al. | | |
| 2020/0133212 A1 * | 4/2020 | Rekunyk | ................. | B65G 5/00 |

FOREIGN PATENT DOCUMENTS

| | | | |
|---|---|---|---|
| CN | 109343995 | A | 2/2019 |
| CN | 111985561 | A | 11/2020 |
| CN | 112990288 | A | 6/2021 |
| CN | 113065854 | A | 7/2021 |
| CN | 114565327 | A | 5/2022 |
| WO | 2019158754 | A1 | 8/2019 |

OTHER PUBLICATIONS

Qu, Bo et al., Research and Implementation on EMS in Distributed Energy Field, Microcomputer Applications, 29(12):1-3, 2013.

Wang, Jinhua et al., Decision Analysis Technology, Theory and Practice of Digital Mine Construction, 2016, 11 pages.

Qian, Yuanlai et al., Tank Fire Alarm Wireless Temperature Measurement System Based on LoRa Technology, Technology of IoT & AI, 51(3): 37-41, 2019.

Liu, Ting et al., Integrated Architecture Design of Warehouse Management and Control Based on Internet of Things, China business & Trade, 34: 128-130, 2013.

Hina Afreen et al., An IoT-Based Real-Time Intelligent Monitoring and Notification System of Cold Storage, IEEE Access, 9: 38236-38253, 2021.

* cited by examiner

Figure 1:
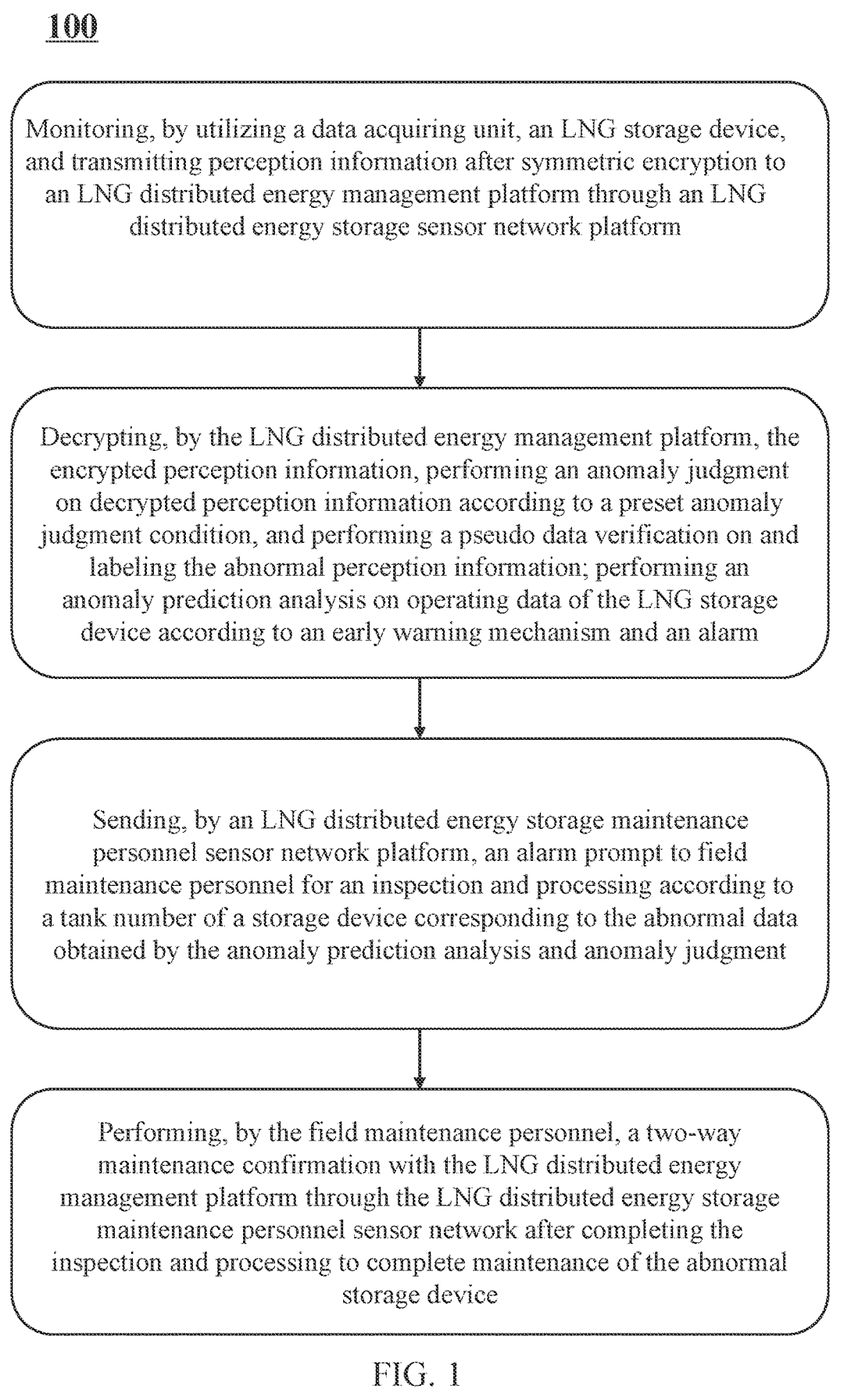

100

Monitoring, by utilizing a data acquiring unit, an LNG storage device, and transmitting perception information after symmetric encryption to an LNG distributed energy management platform through an LNG distributed energy storage sensor network platform Decrypting, by the LNG distributed energy management platform, the encrypted perception information, performing an anomaly judgment on decrypted perception information according to a preset anomaly judgment condition, and performing a pseudo data verification on and labeling the abnormal perception information; performing an anomaly prediction analysis on operating data of the LNG storage device according to an early warning mechanism and an alarm Sending, by an LNG distributed energy storage maintenance personnel sensor network platform, an alarm prompt to field maintenance personnel for an inspection and processing according to a tank number of a storage device corresponding to the abnormal data obtained by the anomaly prediction analysis and anomaly judgment Performing, by the field maintenance personnel, a two-way maintenance confirmation with the LNG distributed energy management platform through the LNG distributed energy storage maintenance personnel sensor network after completing the inspection and processing to complete maintenance of the abnormal storage device

Figure 2:
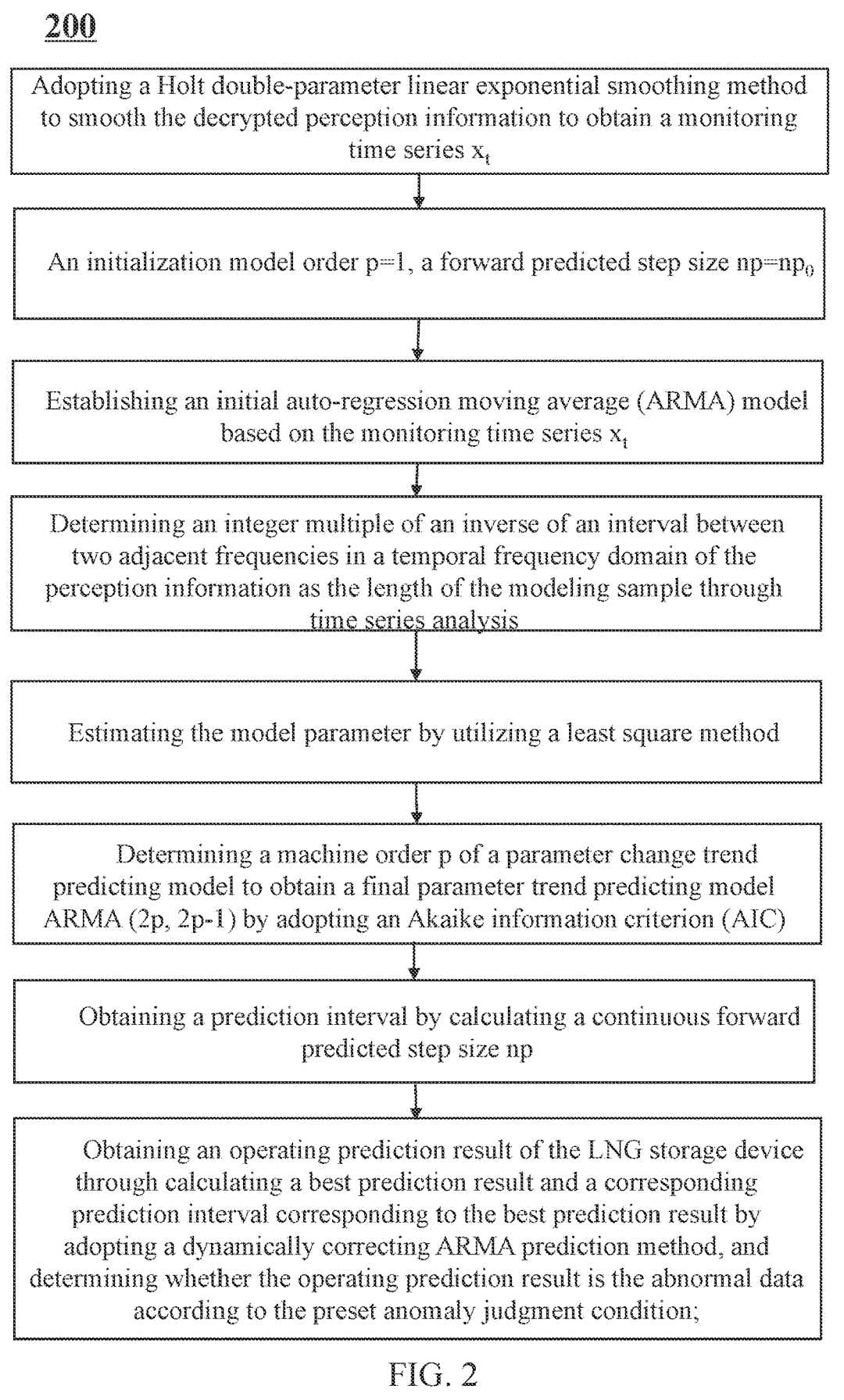

Adopting a Holt double-parameter linear exponential smoothing method to smooth the decrypted perception information to obtain a monitoring time series $x_t$ An initialization model order p=1, a forward predicted step size $np=np_0$ Establishing an initial auto-regression moving average (ARMA) model based on the monitoring time series $x_t$ Determining an integer multiple of an inverse of an interval between two adjacent frequencies in a temporal frequency domain of the perception information as the length of the modeling sample through time series analysis Estimating the model parameter by utilizing a least square method Determining a machine order p of a parameter change trend predicting model to obtain a final parameter trend predicting model ARMA (2p, 2p-1) by adopting an Akaike information criterion (AIC)

Obtaining a prediction interval by calculating a continuous forward predicted step size np Obtaining an operating prediction result of the LNG storage device through calculating a best prediction result and a corresponding prediction interval corresponding to the best prediction result by adopting a dynamically correcting ARMA prediction method, and determining whether the operating prediction result is the abnormal data according to the preset anomaly judgment condition;

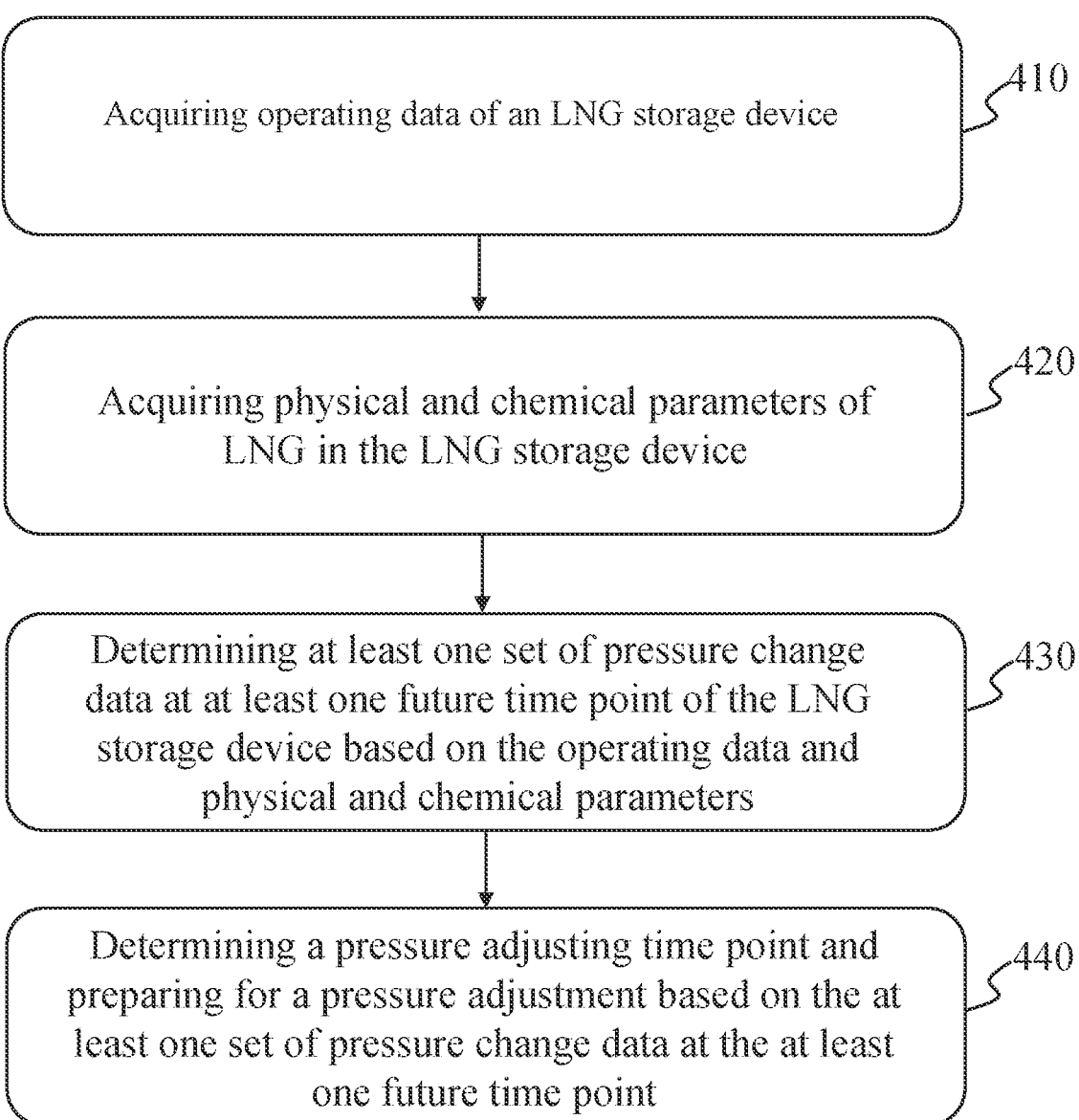

Acquiring operating data of an LNG storage device — 410

Acquiring physical and chemical parameters of LNG in the LNG storage device — 420

Determining at least one set of pressure change data at at least one future time point of the LNG storage device based on the operating data and physical and chemical parameters — 430

Determining a pressure adjusting time point and preparing for a pressure adjustment based on the at least one set of pressure change data at the at least one future time point — 440

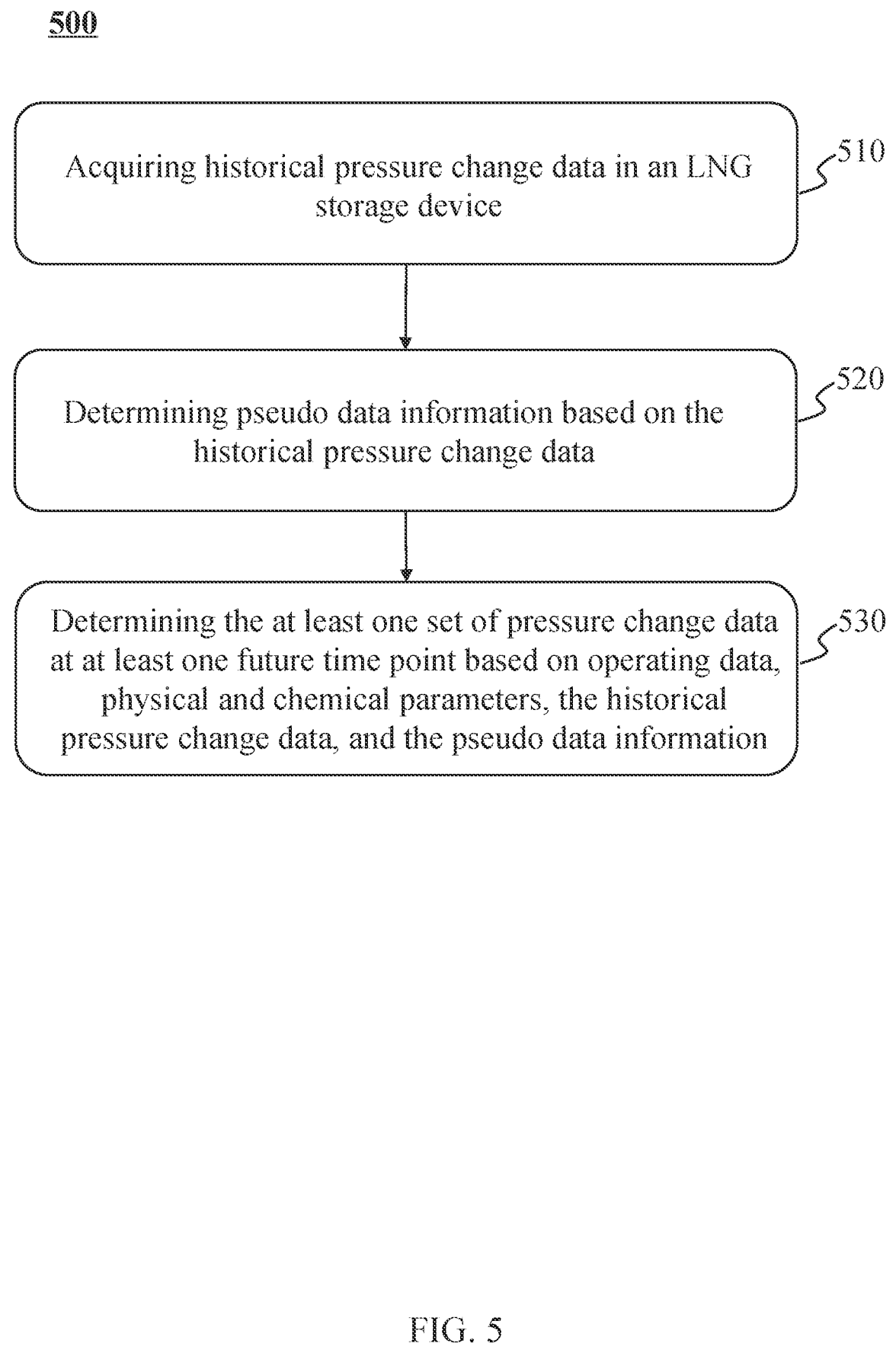

Acquiring historical pressure change data in an LNG storage device    510

Determining pseudo data information based on the historical pressure change data    520

Determining the at least one set of pressure change data at at least one future time point based on operating data, physical and chemical parameters, the historical pressure change data, and the pseudo data information    530

FIG. 5

METHOD FOR MONITORING OPERATION OF LIQUEFIED NATURAL GAS (LNG) STORAGE AND INTERNET OF THINGS SYSTEM (IoT) THEREOF

CROSS-REFERENCE TO RELATED APPLICATIONS

This application is a continuation of U.S. application Ser. No. 18/321,766, filed on May 22, 2023, U.S. Pat. No. 11,842,301 which claims priority of Chinese Patent Application No. 202210563072.1, filed on May 23, 2022, and Chinese Patent Application No. 202310425941.9, filed on Apr. 20, 2023, the entire contents of which are incorporated herein by reference.

TECHNICAL FIELD

The present disclosure relates to the technical field of monitoring energy storage safety, and in particular, to a method for monitoring operation of liquefied natural gas (LNG) storage and an Internet of Things (IoT) system.

BACKGROUND

In August 2021, the Department of Petroleum and Natural Gas of the National Energy Administration and other departments released the "China Natural Gas Development Report (2021)". The report shows that China's multiple supply system of natural gas continues to improve, and the "one network across the country" has basically taken shape. A total of 46,000 kilometers of long-distance pipelines have been built, and the total mileage of natural gas pipelines across China has reached about 110,000 kilometers. However, there are still a large number of economically under-developed areas such as remote suburbs, counties, mountainous areas, rural areas, and areas with insufficient pipelines, where it is impossible to use safe and clean natural gas with obvious advantages in life and work. According to statistics, nearly 600 million people in China still cannot use natural gas.

However, gas markets in outer suburbs, counties, mountainous areas, and rural areas are potential markets for urban gas. The energy supply in these areas is an integral part of a country's entire energy system, and its supply and consumption will inevitably affect China's energy supply and demand. At present, the focus of urban construction is gradually shifting from the urban area to the outer suburbs, counties, mountainous areas, and rural areas, so it is necessary to establish an efficient, safe, and economical energy supply system.

Liquefied Natural Gas (LNG) is now attracting attention as a clean energy source. The combustion of natural gas produces only 50% and 20% of the carbon dioxide and nitrogen oxides produced by combustion of coal, which is ¼ the pollution of LPG and 1/800 the pollution of coal. Due to the high investment cost of pipeline laying, LNG gasification station has better economic efficiency than pipeline gas. In small and medium-sized towns, LNG gasification stations can be used as a gas source for residents. In addition, it can also be used for commercial, business, and household heating, etc. By building a virtual pipeline network system, gas can be sent to the countryside to solve the current situation that nearly 600 million people in China still cannot use natural gas.

Existing LNG storage devices cannot realize an automatic and intelligent perception of storage device status, and data transmission has limitations and certain security risks. The security of the data transmission in the backend is low, and when analyzing the abnormal data of the storage device status data, the pseudo data in the abnormal data cannot be effectively removed, and the abnormal status of the storage device of the gasification station cannot be warned in advance. In addition, LNG evaporates and generates gas in the storage device, which increases the pressure in the LNG storage device, so it is necessary to adjust the pressure in time.

Therefore, it is hoped to provide a method for monitoring operation of LNG storage and an Internet of Things (IoT) system, which can efficiently and intelligently monitor the status of LNG storage devices, transmit, and analyze data safely and accurately, remove pseudo data in abnormal data, and perform reliable and accurate prediction of future pressure change data, so as to facilitate timely detection of abnormalities and processing.

SUMMARY

The purpose of the present disclosure is to overcome deficiencies of the prior art and provide a method for monitoring operation of liquefied natural gas (LNG) storage and a system, which acquires device monitoring data of LNG storage devices through multiple sensors and uploads the device monitoring data to an LNG distributed energy management platform for analysis in real time. The LNG distributed energy management platform establishes a parameter change trend prediction model to analyze the monitoring data in real time, determine abnormal data and perform a pseudo data verification on the abnormal data to screen out pseudo data, and finally send an alarm prompt to maintenance personnel through an early warning mechanism for maintenance on an abnormal storage device, so as to improve the efficiency of safety monitoring of energy storage.

The purpose of the present disclosure is achieved through the following technical solutions.

A method for monitoring operation of LNG storage, executed by a distributed energy management platform of an Internet of Things (IoT) system for monitoring operation of LNG storage, comprising: acquiring operating data of an LNG storage device, physical and chemical parameters of LNG and historical pressure change data in the LNG storage device; determining pseudo data information based on the historical pressure change data; determining at least one set of pressure change data at at least one future time point through a pressure model based on the operating data, the physical and chemical parameters, the historical pressure change data, and the pseudo data information, wherein the pressure model is a machine learning model, the pressure model includes a feature extracting layer and a pressure layer, wherein an input of the feature extracting layer includes a forward prediction step size, the historical pressure change data, and the pseudo data information, an output of the feature extracting layer includes a pressure change feature, and the forward prediction step size is a time interval between future time points for sampling; an input of the pressure layer includes the pressure change feature, the operating data, and the physical and chemical parameters, and an output of the pressure layer includes the at least one set of pressure change data at the at least one future time point; and determining a pressure adjusting time point and preparing for a pressure adjustment based on the at least one set of pressure change data at the at least one future time point.

An Internet of Things (IoT) system for monitoring operation of LNG storage, which is realized by using a method for monitoring operation of LNG storage, wherein the IoT system includes an object platform, a sensor network platform, a management platform, a service platform, and a user platform; the object platform includes an LNG distributed energy storage object platform and an LNG distributed energy storage maintenance personnel object platform; the LNG distributed energy storage object platform is configured to monitor and perceive operating data of an LNG storage device, physical and chemical parameters of LNG and historical pressure change data in the LNG storage device, and transmit the perception information, physical and chemical parameters and the historical pressure change data after symmetric encryption to the LNG distributed energy management platform through the sensor network platform; and the LNG distributed energy storage maintenance personnel object platform is configured for field maintenance personnel to receive an alarm prompt and feedback on maintenance processing; the sensor network platform includes an LNG distributed energy storage sensor network platform and an LNG distributed energy storage maintenance personnel sensor network platform, which are configured to realize a communication connection for perception and control between the management platform and the object platform; the management platform is configured to acquire the operating data, the physical and chemical parameters and the historical pressure change data, determine pseudo data information based on the historical pressure change data, determining at least one set of pressure change data at at least one future time point through a pressure model based on the operating data, the physical and chemical parameters, the historical pressure change data, and the pseudo data information, wherein the pressure model is a machine learning model, the pressure model includes a feature extracting layer and a pressure layer, wherein an input of the feature extracting layer includes a forward prediction step size, the historical pressure change data, and the pseudo data information, an output of the feature extracting layer includes a pressure change feature, and the forward prediction step size is a time interval between future time points for sampling; an input of the pressure layer includes the pressure change feature, the operating data, and the physical and chemical parameters, and an output of the pressure layer includes the at least one set of pressure change data at the at least one future time point, and determining a pressure adjusting time point and preparing for a pressure adjustment based on the at least one set of pressure change data at the at least one future time point, send an alarm prompt to field maintenance personnel for an inspection and processing according to a tank number of the LNG storage device corresponding to the abnormal data obtained by an anomaly prediction analysis and an anomaly judgment through the sensor network platform; the service platform is configured to obtain perception information demanded by a user from the management platform for analysis and storage, and receive control information sent by the user for processing and send processed control information to the management platform; the user platform is configured to obtain the operating data of the LNG storage device from the service platform for various users and send the control information to the service platform; the service platform is further configured to acquire the operating data, the physical and chemical parameters, the historical pressure change data, the at least one set of pressure change data, the pressure adjusting time point demanded by a user from the management platform for analysis and storage, and receive control information sent by the user for processing and send processed control information to the management platform; and the user platform is further configured to obtain the operating data from the service platform, the physical and chemical parameters, the at least one set of pressure change data, the pressure adjusting time point for the user and send the control information to the service platform.

A non-transitory computer readable storage medium storing a set of instructions, when executed by at least one processor, causing at least one processor to perform the above method for monitoring operation of LNG storage.

Beneficial effects of the present disclosure are as follows.

1. The present disclosure can accurately locate a tank number corresponding to abnormal data by automatically acquiring information such as pressure, temperature, and location of LNG storage devices in real-time for anomaly analysis, and improve maintenance efficiency of the field maintenance personnel by sending an alarm prompt to field maintenance personnel of an LNG distributed energy object platform for inspection and processing through an LNG distributed energy storage maintenance personnel sensor network platform.

2. The present disclosure performs a pseudo data verification on determined abnormal data through a pseudo data verification manner, which can intuitively and clearly identify pseudo data and prompt a type of pseudo data displayed by a sensor within this time period, making it convenient for the field maintenance personnel to carry out maintenance and improve maintenance efficiency.

3. The present disclosure also performs an anomaly prediction analysis on the operation trend of LNG storage device and obtain an operating prediction result of the LNG storage device in a corresponding prediction interval by establishing a ARMA parameter trend predicting model, and determines whether the operating prediction result is abnormal data, so that the abnormal data can be detected and early warning can be sent in time, further improving the efficiency of safety monitoring of an LNG storage device.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same numbers denote the same structures, wherein:

FIG. 1 is a flowchart illustrating an exemplary process of a method for monitoring distributed energy storage safety according to some embodiments of the present disclosure;

FIG. 2 is a flowchart illustrating an exemplary process of an anomaly prediction analysis manner according to some embodiments of the present disclosure;

FIG. 4 is a flowchart illustrating an exemplary process for managing LNG storage safety according to some embodiments of the present disclosure;

FIG. 5 is a flowchart illustrating an exemplary process for determining at least one set of pressure change data at at least one future time point according to some embodiments of the present disclosure;

DETAILED DESCRIPTION

Figure 3:
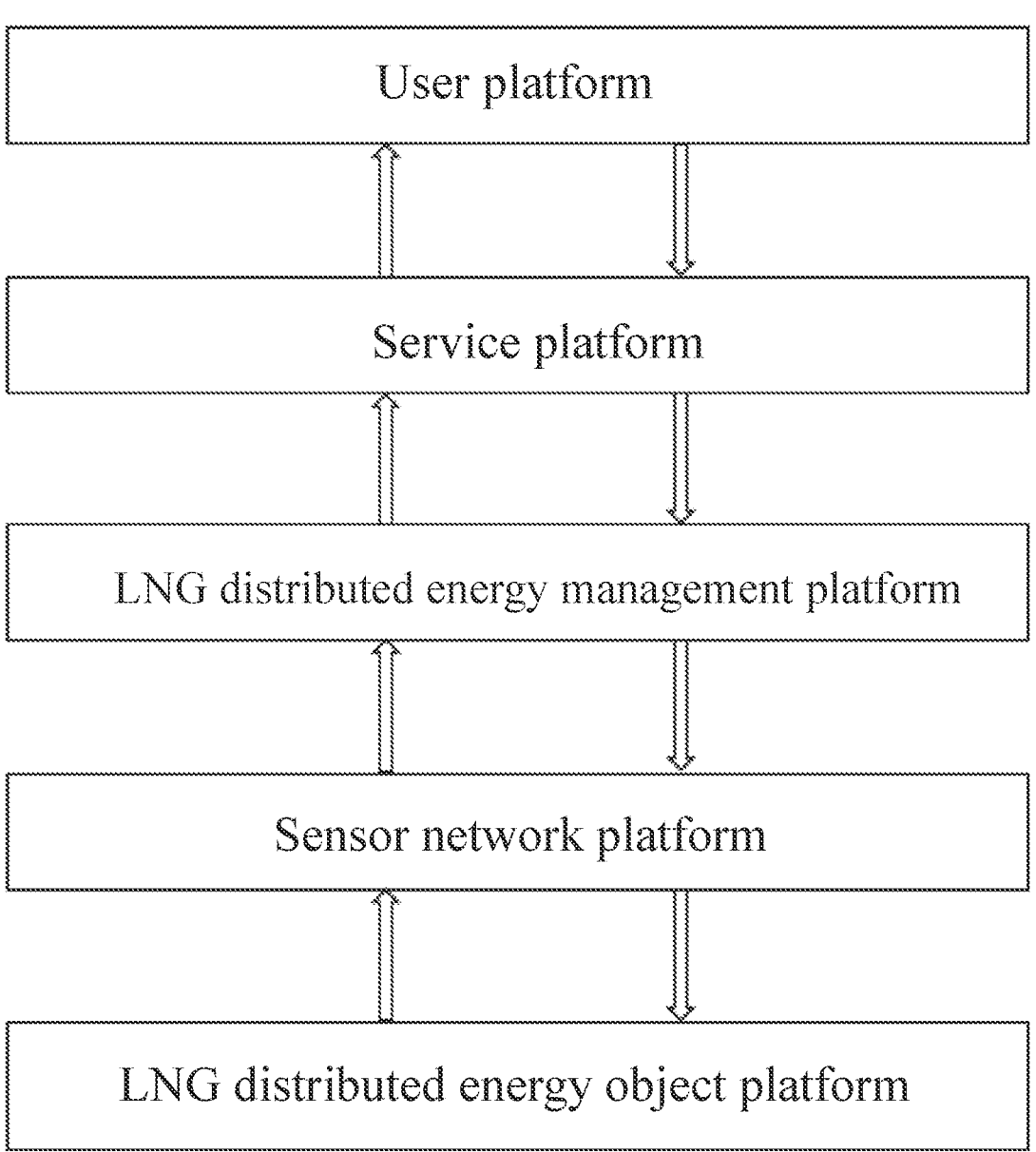
FIG. 3 is a schematic diagram illustrating an Internet of Things system for monitoring distributed energy storage safety according to some embodiments of the present disclosure.

In order to have a clearer understanding of the technical features, purposes, and beneficial effects of the present disclosure, the technical solutions of the present disclosure are now described in detail below. Apparently, the described embodiments are some embodiments of the present disclosure, but not all embodiments, and should not be understood as limiting the applicable scope of the present disclosure. Based on the embodiments of the present disclosure, all other embodiments obtained by persons of ordinary skill in the art without making creative efforts belong to the protection scope of the present disclosure.

Embodiment 1

In the embodiment, as shown in FIG. 1, a method for monitoring distributed energy storage safety includes the following steps.

Step 1: monitoring, by utilizing a data acquiring unit, an LNG storage device, and transmitting perception information after symmetric encryption to an LNG distributed energy management platform through an LNG distributed energy storage sensor network platform.

Step 2: decrypting, by the LNG distributed energy management platform, the encrypted perception information, performing an anomaly judgment on decrypted perception information according to a preset anomaly judgment condition, and performing a pseudo data verification on and labeling the abnormal perception information utilizing a pseudo data verification manner, performing an anomaly prediction analysis on operating data of the LNG storage device according to an early warning mechanism and alarm.

Step 3: sending, by an LNG distributed energy storage maintenance personnel sensor network platform, an alarm prompt to field maintenance personnel for an inspection and processing according to a tank number of a storage device corresponding to the abnormal data obtained by the anomaly prediction analysis and anomaly judgment.

Step 4: performing, by the field maintenance personnel, a two-way confirmation with the LNG distributed energy platform management platform through the LNG distributed energy storage maintenance personnel sensor network platform after completing the inspection and processing to complete maintenance of the abnormal storage device.

In the embodiment, the data acquiring unit is a comprehensive application technology based on a modern and mature, and advanced electronic measuring technology and Internet of Things technology. The data acquiring unit includes a GPS/Beidou locator, a pressure sensor, a temperature sensor, and a monitoring terminal. A working principle of the data acquiring unit is that the GPS/Beidou locator acquires a location of the LNG storage device and pressure at the bottom of the tank, a temperature sensor perceives and acquires pressure and a temperature analog signal of the LNG storage device, and transmits them to a monitoring terminal at the top of the tank through a cable, and an embedded microprocessor of the monitoring terminal converts the analog signal into digital information and transmits the data information and a corresponding tank number through the sensor network platform to the LNG distributed energy management platform for further analysis and processing. Tasks of the embedded microprocessor are to convert the analog signal into computer data suitable for Internet transmission through a certain encoding method, and to minimize an error of acquired data through a "precision memory interpolation algorithm" and a most advanced and accurate 16-bit algorithm.

In the embodiment, step 1 specifically includes that: monitoring, by utilizing a data acquiring unit, a liquefied natural gas (LNG) storage device, perceiving and acquiring pressure, temperature, and position data on the LNG storage device, obtaining encrypted perception information through performing an analog-to-digital conversion on perception information by the data acquiring unit and symmetrically encrypting the perception information by adopting a microsoft point-to-point encryption (MPPE) and Internet Protocol Security (IPSec) mechanism in a binary mode; actively sending, by the data acquiring unit, authentication information to an LNG distributed energy management platform at a designated address through an LNG distributed energy storage sensor network platform, after passing a two-way symmetric authentication, establishing a unique communication channel between the data acquiring unit and the LNG distributed energy management platform to transmit the encrypted perception information.

The present disclosure adopts a microsoft point-to-point encryption (MPPE) and Internet Protocol Security (IPSec) mechanism to symmetrically encrypt the perception information and manage keys by a public-private key verification. MPPE enables terminals to communicate securely from anywhere in the world. MPPE encryption ensures secure transmission of data with a minimal public key cost. These means of authentication and encryption are enforced by a remote server.

In the embodiment, step 2 specifically includes that: decrypting, by the LNG distributed energy management platform, the encrypted perception information, performing an anomaly judgment on decrypted perception information according to a preset anomaly judgment condition, and screening out abnormal perception information; performing a pseudo data verification on the abnormal perception information utilizing a pseudo data verification manner, identifying and labeling a type of pseudo data caused by an external environmental interference; performing an anomaly prediction analysis on operating data of the LNG storage device according to an early warning mechanism.

In the embodiment, the performing a pseudo data verification on the abnormal perception information by utilizing a pseudo data verification manner includes: establishing the pseudo data verification manner, setting an error code in a sensor program of the data acquiring unit to simulate a sensor value during a real electromagnetic interference for pseudo data generated by an electromagnetic interference in a field maintenance process in advance, setting an anomaly analysis result of the LNG distributed energy management platform as pseudo data of the electromagnetic interference; for pseudo data generated by a transmission or device failure, randomly creating a sensor or transmission line failure, and setting the anomaly analysis result labeled by the LNG distributed energy management platform as pseudo data of the sensor or transmission line; and performing a pseudo data analysis on the screened abnormal perception information, and labeling a corresponding type of pseudo data by utilizing the pseudo data verification manner.

In the embodiment, an auto-regression moving average (ARMA) model is an important method to study a time series, which is composed based on an auto-regression (AR) model and a moving average (MA) model. In recent years, the ARMA has also become one of the important methods in studying time series forecasting problems. For a smooth time series$\{x_t\}$, if $x_t$ is not only related to each value $x_{t-1}$, $x_{t-2}, \ldots x_{t-n}$ of first n steps, but also to each disturbance $a_{t-1}$, $a_{t-2}$, $a_{t-m}$ of first m steps (n, m=1, 2, . . . ), then a general ARMA model may be obtained based on an idea of multiple linear regression as follows.

$$x_t = \varphi_1 x_{t-1} + \varphi_2 x_{t-2} + \ldots + \varphi_n x_{t-n}$$
$$-\theta_1 a_{t-1} + \theta_2 a_{t-2} + \ldots + \theta_m a_{t-m} + a_t, a_t \sim NID(0, \sigma_a^2)$$

The equation represents an n-order auto-regressive and m-order moving average model, which is denoted as ARMA (n, m); $\varphi_i$(i=1, 2, . . . n), $\theta_j$(j=1, 2, . . . , m) denote model parameters.

This embodiment adopts a generalized least squares method for model parameter estimation. An idea of the generalized squares method for ARMA (n, m) model parameter estimation is to convert an ARMA model into the AR model, perform a series of linear least squares estimations, and then reduce an obtained AR model to the ARMA model.

In the embodiment, as shown in FIG. 2, the performing an anomaly prediction analysis on operating data of the LNG storage device according to an early warning mechanism includes the following steps.

Data preprocessing: adopting a Holt double-parameter linear exponential smoothing method to smooth the decrypted perception information to obtain a monitoring time series $x_t$.

Model initialization: an initialization model order p=1, a forward predicted step size $np=np_0$; p denotes a machine order of the parameter change trend prediction model, np denotes a count of forward steps for the parameter change trend prediction model to perform the anomaly prediction analysis, and $np_0$ denotes an initialization value of the anomaly prediction analysis.

Model establishment: establishing an initial auto-regression moving average (ARMA) model based on the monitoring time series $x_t$.

Determining a length of a modeling sample: determining an integer multiple of an inverse of an interval between two adjacent frequencies in a temporal frequency domain of the perception information as the length of the modeling sample through time series analysis.

Estimating model parameter: estimating the model parameter by utilizing a least square method.

Inspecting the model and determining an order: determining a machine order p of a parameter change trend predicting model to obtain a final parameter trend predicting model ARMA (2p, 2p−1) by adopting an Akaike information criterion (AIC).

Predicting parameter: obtaining a prediction interval by calculating a continuous forward predicted step size np.

Analyzing the abnormal data: obtaining an operating prediction result of the LNG storage device through calculating a best prediction result and a corresponding prediction interval corresponding to the best prediction result by adopting a dynamically correcting ARMA prediction method, and determining whether the operating prediction result is the abnormal data according to the preset anomaly judgment condition; the preset anomaly judgment condition is that the operating prediction result of the LNG storage device exceeds a set pressure and temperature.

The early warning mechanism is that when the predicted result of the ARMA model is abnormal data, the alarm prompt may be sent to a handheld terminal of the field maintenance personnel respectively through the sensor network platform to remind the field maintenance personnel for processing.

In the embodiment, a data feature of the LNG storage device is analyzed first, and a analysis result is as follows.

(1) Data features. Real-time monitoring data of a monitoring and surveillance system generally takes a time interval of 10 s to 30 s as a cycle. Although actual monitoring data may be intermittent, it may be supplemented by interpolation and smoothing, etc., so data with an even time interval may be obtained finally. Data items related to real-time monitoring data include a monitoring point location, a sensor number, time, and a monitoring value. Manual inspection data is generally data based on cycles of 2 h, 8 h, or 24 h, and the manual inspection data may also be converted into data with a uniform cycle by the interpolation, for example, data in an inspection daily inspection report of a storage device may be interpolated to generate data for every 8 h. On the other hand, the monitoring system records statistical values of the real-time monitoring data of the device every 5 minutes and every hour, such as an average value, a maximum value, and a minimum value, so the real-time monitoring data may be matched with the manual inspection data, and the data obtained by the interpolating the manual detection data shows a smooth change trend of device detection parameters in a long period of time, while a real-time monitoring data curve reflects an instant change of each local device detection parameters in a long period of time. Therefore, these two types of data may be combined for an early warning analysis.

(2) Statistical features. Statistical parameters of the real-time monitoring data, such as an average value and maximum value within a certain period of time, may reflect statistical features of device monitoring parameters such as pressure and temperature within the period of time; a manual inspection value is the same as a single monitoring value, which belongs to an instantaneous measurement value corresponding to a specific time and place. A time interval of a manual inspection is relatively long, so a statistical analysis of the manual inspection is usually conducted for a longer time interval (such as one month). However, for the monitoring data of the device, statistics may be made with a cycle of the manual inspection data as a time length, and the obtained statistical parameters reflect a change of pressure and temperature during the period of the manual inspection to a certain extent. Therefore, a data interval formed by an average value and a maximum value of the monitoring data of the device may contain a manual inspection value.

(3) Correlation features. In the process of the early warning analysis, two aspects are considered. For a predictive early warning of pressure and temperature change trends, based on a correlation of the inspection/monitoring data, the real-time monitoring data is used as an analysis object, and the manual inspection data is used to verify the validity of the model.

In the embodiment, based on the above feature analysis content, the present disclosure proposes a method for processing abnormal data and missing data, which effectively guarantees to improve the reliability of an abnormal data analysis result of the LNG storage device. The data preprocessing specifically includes following processes.

Processing the abnormal perception data, forming the monitoring time series {$x_t$, t=1, 2, . . . , N} for the perceived and acquired operating data of the LNG storage device, and for abnormal monitoring data being zero or with a low probability sensor value, calculating a one-step smoothing value $F_t$ of first $N_x$ numbers by monitoring the first $N_x$ numbers in the monitoring time series to replace the abnormal monitoring data, and selecting actual monitoring operating data to obtain a length $N_x$ of the monitoring time series used for a smoothing calculation.

Processing missing data, for a missing sequence $\{x_t, t=1, 2, \ldots\}$ formed by original monitoring data, firstly obtaining the length $N_x$ of the monitoring time series of the original data required for the smoothing calculation according to an actual monitoring operating data analysis; and setting a count of smoothing steps m, and for gas concentration monitoring values $\{x_t, t=1, 2, \ldots, N_x\}$ of the first $N_x$ points of missing data points, continuously performing the smoothing calculation of m steps to obtain a final smoothed value $F_{t+m}$, and finally inserting the final smoothed value $F_{t+m}$ into the missing sequence to form a complete monitoring data time series.

In the embodiment, considering a possibility of error propagation, a dynamically correcting prediction method is adopted, that is, reserving ARMA model parameters when the prediction error is the smallest, or model parameters when the prediction error is relatively small by evaluating a prediction error after each prediction, and establishing a model with the two model parameters, and using the current data to establish a model at the same time, and by taking an average value of several prediction results, the prediction result can be corrected, which can not only make a prediction along a direction of error reduction, but also make the prediction result be closer to a gas concentration at an average trend of change in a future period, improving a closeness degree of the change trend of gas concentration. Therefore, a dynamically correcting ARMA prediction method includes the following steps.

Evaluating a predicted error, for previous j−1 predictions, calculating an average value of prediction errors of previous n predictions, and obtaining an error minimum value and an error subminimum value.

Determining an effective model order, determining model orders $p_1$ and $p_2$ when the predicted error minimum value and the error subminimum value are obtained as effective model orders of the previous j−1 predictions.

Modeling with current data, for an analysis sequence formed by operating monitoring data of the current LNG storage device, obtaining an optimal order $p_0$ through the ARMA model for parameter estimation and validity inspection.

Predicting model, taking $p=p_0$, $p_1$, $p_2$ as an order respectively to perform an operating data parameter prediction, and obtaining prediction results $X=[x_{j1}, x_{j2}, x_{j3}]$.

Calculating the best prediction result, calculating an average value of each element of $X=[x_{j1}, x_{j2}, x_{j3}]$ to obtain a final prediction result as the best prediction result.

In the embodiment, step 4 specifically includes: the field maintenance personnel sending processing information to the LNG distributed energy management platform through the sensor network after completing the inspection and processing, and the LNG distributed energy management platform confirming whether the processing is completed; the LNG distributed energy management platform obtaining processed tank perception information through the LNG distributed energy storage sensor network platform and confirming that the field maintenance personnel completes the processing if a status of the processed tank perception information is normal, and feeding back to the field maintenance personnel.

Embodiment 2

In the embodiment, an Internet of Things system for monitoring distributed energy storage safety is provided, which is implemented by using a method for monitoring distributed energy storage safety in embodiment one. FIG. 3 is a schematic diagram illustrating a method for monitoring distributed energy storage safety according to some embodiments of the present disclosure. As shown in FIG. 3, the system includes an LNG distributed energy object platform, a sensor network platform, an LNG distributed energy management platform, a service platform, and a user platform.

The LNG distributed energy object platform may be a functional platform for generating perception information and executing control information. The LNG distributed energy object platform may include an LNG distributed energy storage object platform (not shown in FIG. 3) and an LNG distributed energy storage maintenance personnel object platform (not shown in FIG. 3). The LNG distributed energy storage object platform is configured to monitor and perceive operating data of an LNG storage device, and transmit the perception information after symmetric encryption to the LNG distributed energy management platform through the sensor network platform; the LNG distributed energy storage maintenance personnel object platform is configured for field maintenance personnel to receive an alarm alert and feedback on maintenance processing.

The sensor network platform may be a functional platform for managing sensor communication. The sensor network platform may include an LNG distributed energy storage sensor network platform (not shown in FIG. 3) and an LNG distributed energy storage maintenance personnel sensor network platform (not shown in FIG. 3), which are configured to realize a communication connection for perception and control between the LNG distributed energy management platform and the LNG distributed energy object platform.

The LNG distributed energy management platform may be a platform that provides perception management and control management functions for an operating system of the Internet of Things system. The management platform may perform an anomaly judgment and anomaly prediction analysis based on acquired operating data and send the alarm alert to field maintenance personnel for inspection and processing according to a tank number of a storage device corresponding to abnormal data obtained by the anomaly judgment and anomaly prediction analysis. In some embodiments, the LNG distributed energy management platform may further be configured to obtain the operating data of the LNG storage device, physical and chemical parameters of LNG in the LNG storage device, and determine at least one set of pressure change data at at least one future time point of the LNG storage device, and then determine a pressure adjusting time point, and prepare for a pressure adjustment.

The service platform may be a platform for receiving and transmitting data and/or information. The service platform is configured to obtain perception information demanded by a user from the LNG distributed energy management platform for analysis and storage, and receive control information sent by the user for processing and send processed control information to the LNG distributed energy management platform.

The user platform may be a platform for interacting with a user. The user platform may be configured as a terminal device, or the like. The user platform may obtain the operating data of the LNG storage device from the service platform for various users, and send control information to the service platform.

Through closed-loop management formed by a functional structure of the Internet of Things system with five platforms, informatization and intelligence are realized. Through a detailed and clear division of labor of platforms, the abnormal information is monitored in real time, which improves the efficiency of problem handling and makes the information processing of the Internet of Things system smoother and more efficient.

In some embodiments, the Internet of Things system for monitoring distributed energy storage safety in the present disclosure may also perform safety management on LNG storage.

FIG. 4 is a flowchart illustrating an exemplary process for managing LNG storage safety according to some embodiments of the present disclosure. In some embodiments, a process 400 may be executed by an LNG distributed energy management platform. As shown in FIG. 4, a process 400 includes the following steps.

Step 410, acquiring operating data of an LNG storage device.

The LNG storage device refers to a device for storing LNG, or the like. For example, an LNG storage tank, etc. For more information about the LNG storage device, please refer to the relevant descriptions of the LNG storage device in FIG. 1.

The operating data refers to relevant parameters of operation of the LNG storage device, etc. In some embodiments, the operating data may at least include thermal conductivity, environment temperature, and storage temperature. For more information about the operating data, please refer to the relevant descriptions of the operating data in FIG. 1.

The LNG distributed energy management platform may obtain the operating data of the LNG storage device in various ways. For example, the LNG distributed energy management platform may acquire the operating data of the LNG storage device through a data acquiring unit. For more information about the data acquiring unit, please refer to FIG. 1 and its related descriptions.

In some embodiments, the LNG distributed energy management platform may respond to a change in the quality of stored LNG to determine a changed storage temperature based on the operating data and physical and chemical parameters. For example, the distributed energy management platform may set weights of each operating data and physical and chemical parameter, and determine the changed storage temperature by weighted calculation. A specific weight may be set according to experience.

Step 420, acquiring physical and chemical parameters of LNG in the LNG storage device.

The physical and chemical parameters refer to parameters related to physical properties and chemical properties of substances. In some embodiments, the physical and chemical parameters may at least include a type, pressure, and quality of the LNG at a plurality of consecutive time points.

The LNG distributed energy management platform may obtain the physical and chemical parameters of the LNG in the LNG storage device in various ways. For example, the LNG distributed energy management platform may acquire the physical and chemical parameters of the LNG in the LNG storage device through the data acquiring unit.

Step 430, determining at least one set of pressure change data at at least one future time point of the LNG storage device based on the operating data and physical and chemical parameters.

The pressure change data refers to parameters related to a pressure change of the LNG in the LNG storage device.

The LNG distributed energy management platform may determine the at least one time point in various ways. For example, the LNG distributed energy management platform may set a first preset rule related to selection of the future time point based on the operating data and physical and chemical parameters and determine the at least one future time point according to the first preset rule, and the first preset rule may set according to experience. For example, the first preset rule may be that, when the operating data is r and the physical and chemical parameters are t, a time point after u min from a current time point is selected as the future time point.

In some embodiments, the LNG distributed energy management platform may also determine the at least one future time point according to pseudo data information. For more details, please refer to FIG. 6 and its related descriptions.

Understandably, pressure in the LNG storage device is constantly changing. The thermal conductivity, environment temperature, etc. in the operating data, and the type and quality of the LNG in the physical and chemical parameters can affect evaporation of the LNG in the LNG storage device, thereby affecting the pressure in the LNG storage device. Therefore, the LNG distributed energy management platform may determine at least one set of pressure change data at least one future time point in the LNG storage device based on the operating data and physical and chemical parameters.

The LNG distributed energy management platform may determine at least one set of pressure change data at the at least one future time point of the LNG storage device in a plurality of ways based on the operating data and physical and chemical parameters. For example, the LNG distributed energy management platform may organize historical data such as historical operating data, historical physical and chemical parameters, and historical pressure change data at historical time points into a data comparison table, and determine the at least one set of pressure change data at the at least one future time point based on the data comparison table.

In some embodiments, the LNG distributed energy management platform may further determine the at least one set of pressure change data at the at least one future time point based on the operating data, physical and chemical parameters, historical pressure change data, and pseudo data information. For more details, please refer to FIG. 5 and its related descriptions.

step 440, determining a pressure adjusting time point and preparing for a pressure adjustment based on the at least one set of pressure change data at the at least one future time point.

The pressure adjusting time point refers to a time point when a pressure adjusting operation is performed.

Pressure adjustment preparation refers to preparation work before the pressure adjusting operation is performed, for example, checking a sealing condition.

The LNG distributed energy management platform may determine the pressure adjusting time point and prepare for the pressure adjustment in various ways based on the at least one set of pressure change set at the at least one future point. For example, the LNG distributed energy management platform may set a preset pressure threshold, compare the at least one set of pressure change data at the at least one future time point with the preset pressure threshold, and determine a corresponding future time point when pressure change data exceeds the preset pressure threshold as the pressure adjusting time point, and prepare for the pressure adjustment.

In some embodiments, the LNG distributed energy management platform may determine a candidate time point when the at least one set of pressure change data reaches the preset pressure threshold based on the at least one set of pressure change data at the at least one future time point; and the pressure adjusting time point is determined based on the candidate time point and a pseudo data feature. For more details about the pseudo data feature, please refer to FIG. 6 and its related descriptions. For more information about the pseudo data, please refer to FIG. 1, FIG. 5, and their related descriptions.

The candidate time point refers to a corresponding future time point when the pressure change data meets a certain condition.

In some embodiments, the LNG distributed energy management platform may compare the at least one set of pressure change data at the at least one future time point with the preset pressure threshold, and determine a corresponding future time point when the pressure change data exceeds the preset pressure threshold as the candidate time point.

In some embodiments, the LNG distributed energy management platform may determine the pressure adjusting time point in various ways based on the candidate time point and pseudo data feature. For example, the LNG distributed energy management platform may construct a target vector based on the candidate time point and pseudo data feature, and determine the pressure adjusting time point through a vector database.

The vector database refers to a database for storing, indexing, and querying vectors. Through the vector database, a similarity query and other vector management may be quickly performed on a large number of vectors.

The vector database may include a plurality of reference vectors and reference adjusting time points corresponding to the plurality of reference vectors. The reference vector may be constructed based on historical candidate time points and a historical pseudo data feature. The reference pressure adjusting time point corresponding to the reference vector may be obtained according to an actual pressure adjusting time point corresponding to the historical data.

The LNG distributed energy management platform may determine a reference vector that meets a preset condition as an associated vector by searching the vector database based on the target vector, and use a reference pressure adjusting time point corresponding to the associated vector as the pressure adjusting time point. The preset condition may be that a vector distance is smaller than a distance threshold, the vector distance is the smallest, or the like. The distance threshold may be a system default value, an experience value, an artificial preset value, or any combination thereof, and may be set according to an actual need, which is not limited in the present disclosure.

In some embodiments, the LNG distributed energy management platform may adjust the candidate time point based on the pseudo data feature to determine the pressure adjusting time point. For example, the LNG distributed energy management platform may calculate the pressure adjusting time point through equation (1) based on pseudo data feature and the candidate time point.

$$t = t_0 \times e^{(-W)} \tag{1}$$

Where t denotes the pressure adjusting time point, $t_0$ denotes the candidate time point, and W denotes pseudo data feature coefficients greater than or equal to 0, which may be obtained according to the pseudo data feature. For example, the greater the count of pseudo data and the more densely it distributed, the larger the W.

It is understandable that the more serious the pseudo data is (the greater the count of pseudo data and the denser its distribution), the more appropriate the pressure adjusting time point should be advanced to ensure the timeliness of the pressure adjusting operation. According to some embodiments of the present disclosure, based on the pseudo data feature, determining the pressure adjusting time point by adjusting the candidate time point can determine a pressure adjusting time point in line with reality according to severity of the pseudo data, ensuring the timeliness of a pressure adjustment control and leaving sufficient preparation time for field maintenance personnel.

According to some embodiments of the present disclosure, determining the candidate time point when the preset pressure threshold is reached, and combining with the pseudo data feature to determine the pressure adjusting time point can consider an impact of the pseudo data feature on the pressure adjusting time point, making a determination process more precise.

In some embodiments, the LNG distributed energy management platform may obtain actual pressure change data; perform a failure analysis on the LNG storage device based on the actual pressure change data and the at least one set of pressure change data at the at least one future time point.

The actual pressure change data refers to an actual value of the pressure change data corresponding to the at least one future time point.

The LNG distributed energy management platform may obtain the actual pressure change data in various ways. For example, the LNG distributed energy management platform may obtain the actual pressure change data through the data acquiring unit.

It is understandable that when a situation where a difference between the actual pressure change data and the least one set of pressure change data at the at least one future time point exceeds a certain range occurs frequently, there may be a failure in the LNG storage device, and a failure analysis is required. The failure analysis may include judging a failure type, etc.

In some embodiments, the LNG distributed energy management platform may perform a data comparison, if a count of pressure change data whose difference with the actual pressure change data exceeds a preset difference threshold exceeds a preset count threshold, it is determined that there is a failure in the LNG storage device.

In some embodiments, the LNG distributed energy management platform may obtain a difference distribution time point based on the actual pressure change data and the at least one set of pressure change data at the at least one future time point; Based on the pseudo data feature, obtain a distribution time point of the pseudo data; determine a similarity based on the difference distribution time point and the distribution time point of the pseudo data; and determine the failure type based on the actual pressure change data, the at least one set of pressure change data at the at least one future time point, and the similarity.

The LNG distributed energy management platform may perform the data comparison, and determine a future time point corresponding to pressure change data whose difference with the actual pressure change data exceeds the preset difference threshold as the difference distribution time point.

The LNG distributed energy management platform may determine a time point when there is pseudo data as a pseudo data distribution time point based on the pseudo data feature. For more information about the pseudo data feature, please refer to FIG. 6 and its related descriptions.

The similarity refers to a parameter representing a degree of similarity between the difference distribution time point and the pseudo data distribution time point.

In some embodiments, the LNG distributed energy management platform may determine the similarity in various ways based on the difference distribution time point and the pseudo data distribution time point. For example, the LNG distributed energy management platform may compare the difference distribution time point with the pseudo data distribution time point, determine a time point when the difference between the difference distribution time point with the pseudo data distribution time point is less than a preset distribution time threshold as a similar distribution time point, and determine a ratio of count of similar distribution time points to the difference distribution time point as the similarity.

The failure type may include an LNG storage device failure, a data acquiring unit failure, an external interference, etc.

In some embodiments, the LNG distributed energy management platform may determine the failure type in various ways based on the actual pressure change data, the at least one set of pressure change data at the at least one future time point and the similarity. For example, the LNG distributed energy management platform may determine the failure type according to a second preset rule. The second preset rule may include determining the failure type as an external interference type if the similarity between the difference distribution time point and the pseudo data distribution time point exceeds a similarity threshold; The second preset rule may also include that if the difference between the actual pressure change data and the at least one set of pressure change data at the at least one future time point exceeds a preset difference threshold, and a count of the pressure change data whose the difference exceeds the preset difference threshold exceeds a preset difference count threshold, and the similarity between the difference distribution time point and the pseudo data distribution time point does not exceed a similarity threshold, then it is determined the failure type as a failure type of an LNG storage device.

For more information about the failure analysis, please refer to the related descriptions of the anomaly judgment and anomaly prediction analysis performed on the acquired operating data in FIG. 2.

It is understandable that due to the interference of the external environment, there may be varying amounts of pseudo data in the pressure change data, which may have a certain impact on pressure prediction and failure analysis. By judging the failure type based on the actual pressure change data, at least one set of pressure change data and similarity of at least one future time point described in some embodiments of this disclosure, it can reasonably and reliably determine whether the data difference is caused by external interference, thus, the accuracy of failure analysis can be improved.

According to some embodiments of the present disclosure, performing the failure analysis on the LNG storage device based on the actual pressure change data and the at least one set of pressure change data at the at least one future time point can comprehensively consider various factors that affect a failure analysis result, making a determination process of the failure analysis accurate and reasonable and helping staff to deal with a related failure in time.

In some embodiments of the present disclosure, through acquiring operating data and physical and chemical parameters and determining the at least one set of pressure change data at the at least one future time point to determine the pressure adjusting time point and prepare for the pressure adjustment can monitor and analyze a pressure situation in the LNG storage device intelligently, accurately predict a future pressure change and reduce a cost and error of manual monitoring at the same time, facilitate to detect an abnormal situation in advance and arrange staff arranged to deal with the abnormal situation in time to avoid potential safety problems.

FIG. 5 is a flowchart illustrating an exemplary process for determining at least one set of pressure change data at at least one future time point according to some embodiments of the present disclosure. In some embodiments, a process 500 may be executed by an LNG distributed energy management platform. As shown in FIG. 5, the process 500 includes the following steps.

Step 510, acquiring historical pressure change data in an LNG storage device.

The historical pressure change data refers to pressure change data in a historical time.

The LNG distributed energy management platform may obtain the historical pressure change data in various ways. For example, the LNG distributed energy management platform may obtain the historical pressure change data through a storage device.

Step 520, determining pseudo data information based on the historical pressure change data.

The pseudo data information may be information representing whether pseudo data exists or not, and a size of pseudo data. The pseudo data may be data with an error due to external environment interference and other factors. For more information about the pseudo data, please refer to FIG. 1 and its related descriptions. The pseudo data information may reflect a degree of an impact of an interference factor on pressure monitoring.

The LNG distributed energy management platform may determine the pseudo data information in various ways based on the historical pressure change data. For example, the LNG distributed energy management platform may screen the historical pressure change data through an anomaly judgment condition, and then perform a pseudo data verification on screened abnormal information through a pseudo data verification manner to determine the pseudo data information. For more information about the pseudo data verification manner and anomaly judgment condition, please refer to the relevant descriptions in FIG. 1 and FIG. 2.

Step 530: determining the at least one set of pressure change data at the at least one future time point based on operating data, physical and chemical parameters, the historical pressure change data, and the pseudo data information.

In some embodiments, the LNG distributed energy management platform may determine the at least one set of pressure change data at the at least one future time point in various ways based on the operating data, the physical and chemical parameters, the historical pressure change data, and the pseudo data information. For example, the LNG distributed energy management platform may construct a target vector based on the operating data, the physical and chemical parameters, the historical pressure change data, and the pseudo data information, and determine the at least one set of pressure change data at the at least one future time point through a vector database. For a specific method of determination through the vector database, please refer to the method of determining a pressure adjusting time point through the vector database in FIG. 4.

In some embodiments, the LNG distributed energy management platform may determine a count and step size of the at least one future time point according to the pseudo data information. For details, please refer to FIG. 6 and its related descriptions.

In some embodiments, the LNG distributed energy management platform may predict the at least one set of pressure change data at the at least one future time point through a pressure model based on the operating data, the physical and chemical parameters, the historical pressure change data, and the pseudo data information.

The pressure model may be a model that determines the at least one set of pressure change data at the at least one future time point. In some embodiments, the pressure model may be a machine learning model with a customized structure hereinafter. The pressure model may also be a machine learning model with other structures, such as a neural network (NN) model.

In some embodiments, the pressure model may include a feature extracting layer and a pressure layer.

The feature extracting layer may be configured to extract a pressure change feature of the pressure change data. An input of the feature extracting layer may include the step size (the forward predicted step size np), the historical pressure change data, the pseudo data information, and an output of the feature extracting layer may include the pressure change feature. The pressure change feature refers to feature data required to determine at least one set of future pressure change data at the at least one future time point. For example, pressure change data without pseudo data, data of a preset time step size. For more information about the step size, please refer to the related descriptions in FIG. 2 and FIG. 4. The feature extracting layer may be a long short-term memory (LSTM) model.

The pressure layer may be configured to determine the at least one set of future pressure change data at the at least one future time point. An input of the pressure layer may include the pressure change feature, the operating data, and the physical and chemical parameters, and an output of the pressure layer may include the at least one set of future pressure change data at the at least one future time point. For more information about the operating data, the physical and chemical parameters, and the at least one set of future pressure change data at the at least one future time point, please refer to FIG. 4 and its related descriptions. The pressure layer may be a recurrent neural network (RNN) model, or the like.

In some embodiments, an output range of the pressure model may be affected by the step size.

It is understandable that the larger the count of the pseudo data, the less sample data available for prediction, and the step size may be correspondingly reduced to ensure accuracy of the prediction. The smaller the step size, the smaller the count of time points available for the prediction, and the output range of the pressure model decreases accordingly.

By determining the step size through the pseudo data information described in some embodiments of the present disclosure, the accuracy of the output of the pressure model can be improved to a certain extent, meeting a requirement for use and data processing.

In some embodiments, the feature extracting layer and the pressure layer may be obtained through joint training. In some embodiments, a first training sample of the joint training includes a sample step size, sample historical pressure change data, sample pseudo data information, sample operating data, sample physical and chemical parameters, and a first label is an actual value of the at least one set of future pressure change data at the at least one future time point. Inputting the sample step size, the sample historical pressure change data, and the sample pseudo data information into the feature extracting layer, the pressure change feature output by the feature extracting layer is obtained.

Using the pressure change feature as the first training sample data, and inputting the first training sample data together with the sample operating data and the sample physical and chemical parameters into the pressure layer, then the at least one set of future pressure change data at the at least one future time point is obtained. Based on the actual value of at least one set of future pressure change data at the at least one future time point and at least one set of future pressure change data at the at least one future time point output by the pressure layer, a loss function is constructed and parameters of the feature extracting layer and the pressure layer are synchronously updated. Through parameter update, a trained feature extracting layer and a trained pressure layer are obtained.

By predicting at least one set of pressure change data through the pressure model described in some embodiments of the present disclosure, multiple factors affecting the pressure change data and a relationship between the multiple factors can be comprehensively considered to obtain accurate pressure change data.

In some embodiments of the present disclosure, determining the at least one set of pressure change data at the at least one future time point based on the operating data, the physical and chemical parameters, the historical pressure change data, and the pseudo data information can consider an impact of the pseudo data information on a process of determining the pressure change data, improving accuracy of a pressure change data prediction and reducing an error caused by an interference factor.

Figure 6:
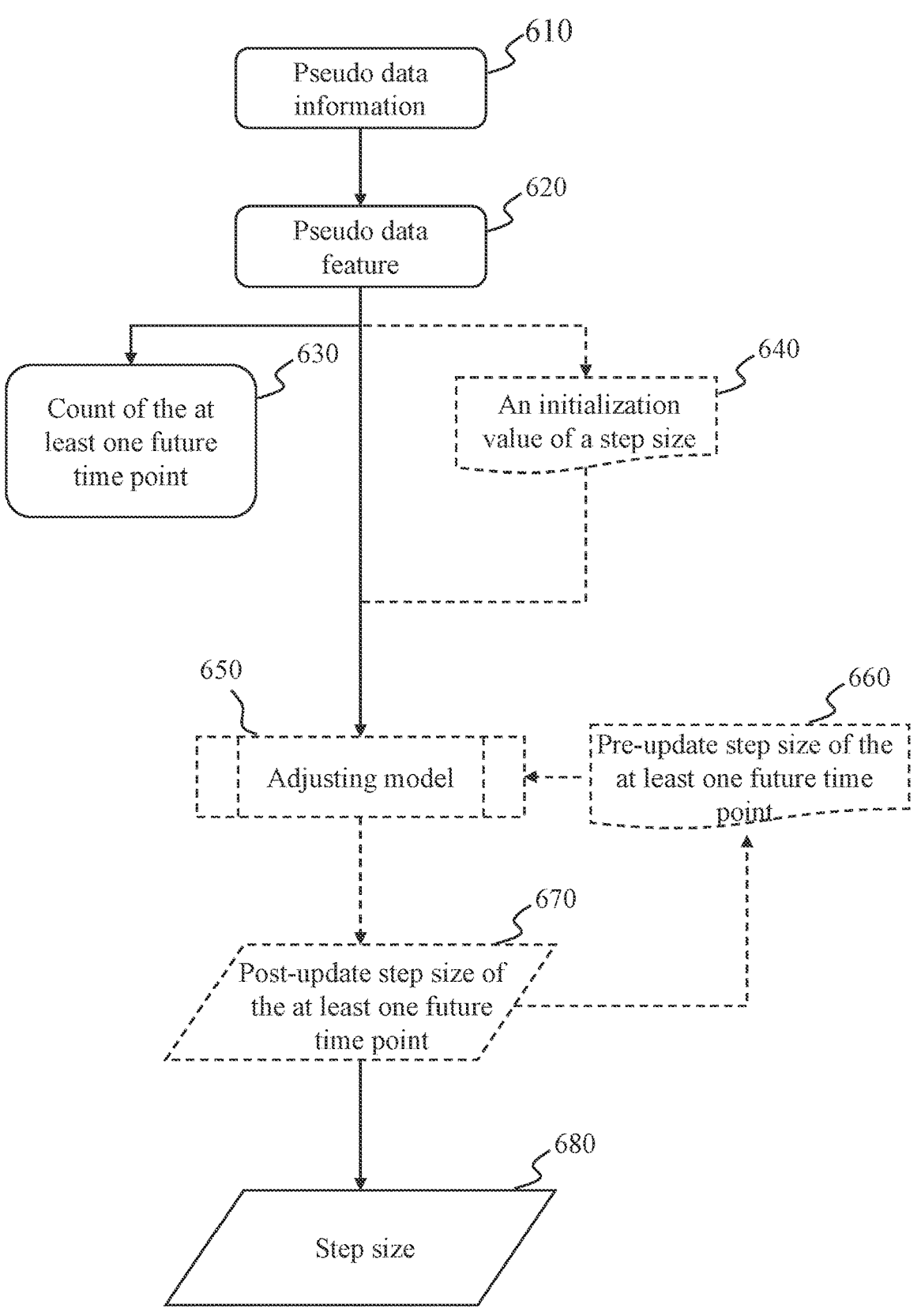
FIG. 6 is a schematic diagram illustrating an exemplary process for determining at least one future time point according to some embodiments of the present disclosure.

FIG. 6 is a schematic diagram illustrating an exemplary process for determining at least one future time point according to some embodiments of the present disclosure.

In some embodiments, an LNG distributed energy management platform may determine a pseudo data feature 620 based on pseudo data information 610. Based on the pseudo data feature 620, a count of the at least one future time point 630 and a step size 680 are determined.

The pseudo data feature 620 refers to feature information related to pseudo data. For example, the pseudo data feature 620 may include a count of the pseudo data, a distribution feature of the pseudo data, or the like.

The distribution feature of the pseudo data may include a concentration degree of a pseudo data sequence, an order situation of the pseudo data sequence in a time series, or the like. The concentration degree of the pseudo data sequence refers to a parameter representing a degree of concentration of pseudo data sequence distribution. For example, if a time series contains 500 data, wherein 109th to 112th data according to a chronological order are pseudo data, then the 109th to 112th data forms a pseudo data sequence, and a concentration degree of the pseudo data sequence is 4. The order situation of the pseudo data sequence in a time series refers to an order average of the pseudo data sequence or a ratio of an order of a first pseudo data in a pseudo data sequence. For example, the order of the pseudo data sequence in the time series may be expressed as 111 (round to an integer) by the order average, and may be expressed as 21.8% (109/500) by the ratio of an order of a first pseudo data in a pseudo data sequence.

In some embodiments, the LNG distributed energy management platform may determine the pseudo data feature 620 in various ways based on the pseudo data information 610. For example, the LNG distributed energy management platform may determine the pseudo data feature 620 through a determination model based on the pseudo data information 610.

The determination model is a model that determines the pseudo data feature 620. In some embodiments, the determination model may be a NN model, an RNN model, or the like.

An input of the determination model may be the pseudo data information 610, and an output of the determination model may be the pseudo data feature 620.

The determination model may be obtained by training a plurality of third training samples with labels.

The third training sample may include sample pseudo data information, which may be obtained based on historical data. The labels may include actual pseudo data features, which may be manually labeled.

Step size 680 (the forward predicted step size np) refers to a time interval between future time points for sampling. For more information about the step size, please refer to the relevant descriptions of the forward prediction step size np in FIG. 2.

In some embodiments, the LNG distributed energy management platform may determine the count of the at least one future time point 630 and the step size 680 in various ways based on the pseudo data feature 620. For example, the LNG distributed energy management platform may determine the count of the at least one future time point 630 and the step size 680 based on the pseudo data feature 620 through a third preset rule. The third preset rule may include a corresponding relationship between the pseudo data feature 620 and the count of the at least one future time point 630. For example, the third preset rule may include: the count of future time points=a*a count of the pseudo data, where a is a coefficient set according to experience.

The third preset rule may also include an adjustment relationship between the pseudo data feature 620 and a step size of the at least one future time point. For example, the third preset rule may include setting a concentration degree threshold as e, an initialization value of the step size as f, and whenever the concentration degree of the pseudo data sequence in the pseudo data feature 620 is higher than the concentration degree threshold e by a value h, the LNG distribution energy management platform may reduce g as the step size from the initialization value of the step size f. The concentration degree threshold refers to a preset concentration degree threshold of the pseudo data sequence. The third preset rule may be set based on experience, a user requirement, or the like.

It is understandable that when the count of pseudo data is relatively large, sample data available for prediction may reduce. At this time, reducing the step size 680 can make up for an accuracy loss caused by a large count of the pseudo data to a certain extent; however, if the count of pseudo data is relatively small, it is not necessary to set the step size 680 to be too small, so as to prevent efficiency of prediction from being affected by a too-small step size 680.

When the concentration degree of the pseudo data sequence is relatively high, it leads to an uneven distribution of real data in the time series (e.g., data missing at several consecutive time points). At this time, reducing the step size 680 may make up for the accuracy loss caused by a high concentration degree of the pseudo data sequence to a certain extent.

In some embodiments, the LNG distributed energy management platform may determine an initialization value of a step size 640 based on the pseudo data feature 620. The initialization value of a step size 640 is the initialization value $np_0$ of the anomaly prediction analysis. For more information about the initialization value of a step size, please refer to the relevant descriptions of the initialization value of the anomaly prediction analysis in FIG. 2.

In some embodiments, the LNG distributed energy management platform may determine the initialization value of a step size 640 in various ways based on the pseudo data feature 620. For example, the LNG distributed energy management platform may determine the initialization value of a step size 640 through a data comparison table based on the pseudo data feature 620. As an example only, the LNG distributed energy management platform may organize a plurality of historical pseudo data feature and corresponding historical initialization values of a step size corresponding to the plurality of historical pseudo data feature into the data comparison table, and determine the initialization value of a step size 640 based on the data comparison table.

In some embodiments, the LNG distributed energy management platform may calculate the step size 680 based on the initialization value of a step size 640 through equation (2).

$$np = np_0 - \lambda \sum\nolimits_{i=1}^{n} \frac{(k_i - w_i)}{n} \tag{2}$$

Where np denotes the step size 680, $np_0$ denotes the initialization value of a step size 640, $\lambda$ denotes a coefficient greater than 0 obtained based on experience, $k_i$ denotes a concentration degree of an i-th pseudo data sequence, and $w_i$ denotes a weight of the concentration degree of the i-th pseudo data sequence, the weight is related to the order situation of the pseudo data sequence in the time series, the further back the order, the greater the weight; n denotes a total count of data in the time series; and $1 \leq i \leq n$.

It is understandable that the earlier the order of the pseudo data sequence in the time series, that is, the earlier an occurrence time, meaning that the data is older and has a relatively small impact on prediction accuracy; the later the order of the pseudo data in the time series, that is, the later the occurrence time, meaning that the data is newer and has a relatively greater impact on the prediction accuracy.

In some embodiments, the LNG distributed energy management platform may adjust the initialization value of a step size 640 through an adjusting model 650 based on the pseudo data feature 620 to determine a dynamic step size 680.

The adjusting model 650 is a model that determines the dynamic step size 680. In some embodiments, the adjusting model 650 may be a neural network (NN) model, or the like.

An input of the adjusting model 650 may be a pre-update step size of the at least one future time point 660 and a pseudo data sequence feature vector. An output of the adjusting model 650 may be a post-update step size of the at least one future time point 670. The pre-update step size of at least one future time point 660 refers to a step size that needs to be updated during a dynamic updating process of the step size.

In some embodiments, the LNG distributed energy management platform may determine the pseudo data sequence feature vector based on the pseudo data feature 620, for example, the LNG distributed energy management platform may determine the pseudo data sequence feature vector as $[(j_1, k_1), (j_2, k_2), (j_3, k_3), (j_4, k_4)]$, where $j_1$-$j_4$ are the concentration degrees of the pseudo data sequence 1-4, and $k_1$-$k_4$ are the orders of the pseudo data sequence 1-4 in the time series.

The adjusting model 650 may be obtained by training a plurality of second training samples with labels. A plurality of second training samples with labels may be input into an initial adjusting model, a loss function is constructed through the labels and outputs of the initial adjusting model, and parameters of the initial adjusting model are iteratively updated based on the loss function. When the loss function of the initial adjusting model satisfies a set condition, a model training is completed, and a trained adjusting model 650 is obtained. The set condition may include one or more conditions such as the loss function being smaller than a threshold, converging, or a training period of the loss function reaching a threshold.

The second training samples may include a pre-step size of a sample future time point and a sample pseudo data sequence feature vector, which may be obtained based on historical data. The labels may include an actual post-update step size. In some embodiments, the LNG distributed energy management platform may determine an actual step size corresponding to a prediction result whose prediction accuracy is higher than an accuracy threshold in the historical data corresponding to the sample data as a label.

It is understandable that the pre-update step size of the at least one future time point 660 inputting to the adjusting model 650 may be the initialization value of a step size 640, and combining with a pseudo data sequence feature vector of a current time point 1, the post-update step size of the at least one future time point 670 may be outputted. After a certain period, the post-updated step size of the at least one future time point may continue to be used as the pre-update step size of the at least one subsequent future time point inputted to the adjusting model 650, combining with a pseudo data sequence feature vector of a current time point 2, a post-update step size of the at least one more subsequent future time point may be outputted, so as to realize a dynamic adjustment of the step size 680.

According to some embodiments of the present disclosure, determining the dynamic step size by adjusting the initialization value through the adjusting model based on the pseudo data feature can continuously adjust a step size intelligently based on an actual situation of data, so as to obtain a dynamic step size more in line with reality.

In some embodiments, during the dynamic adjusting process, the step size 680 may not exceed a preset lower limit.

In some embodiments, the LNG distributed energy management platform may determine the preset lower limit based on an anomaly processing response time. For example, the LNG distributed energy management platform may determine the anomaly processing response time as the preset lower limit.

The anomaly processing response time refers to a time required for staff to process after abnormal data is predicted.

It is understandable that although reducing the step size can make the prediction more accurate, the step size is too small, the abnormal data is predicted, the staff may not have enough time to process it. In some embodiments of the present disclosure, setting the step size not exceeding the preset lower limit during the dynamic adjusting process can avoid a situation that the staff may have no time to deal with an abnormal situation as much as possible.

According to some embodiments of the present disclosure, determining the pseudo data feature and then further determining the count and the step size of the at least one future time point based on the pseudo data information can comprehensively consider various factors that affect accuracy of a prediction result, and determine a more accurate count and a step size of future time points.

One or more embodiments of the present disclosure also provide a non-transitory computer-readable storage medium storing computer instructions, and when a computer reads the computer instructions stored in the storage medium, the computer executes an LNG storage safety management method in any one of the above-mentioned embodiments.

The basic principles, main features, and advantages of the present disclosure have been shown and described above. Those skilled in the industry should understand that the present disclosure is not limited by the above-mentioned embodiments. What is described in the above-mentioned embodiments and the description only illustrates the principle of the present disclosure. Without departing from the spirit and scope of the present disclosure, the present disclosure may also have possible variations and improvements, which all fall within the scope of the claims of the present invention. The scope of the claims of the present disclosure is defined by the appended claims and their equivalents.

What is claimed is:

1. A method for monitoring operation of liquefied natural gas (LNG) storage, executed by an LNG distributed energy management platform of an Internet of Things (IoT) system for monitoring operation of LNG storage, comprising:

acquiring operating data of an LNG storage device, physical and chemical parameters of LNG, and historical pressure change data in the LNG storage device;

determining pseudo data information based on the historical pressure change data;

determining at least one set of pressure change data at at least one future time point through a pressure model based on the operating data, the physical and chemical parameters, the historical pressure change data, and the pseudo data information, wherein the pressure model is a machine learning model, the pressure model includes a feature extracting layer and a pressure layer, wherein an input of the feature extracting layer includes a forward prediction step size, the historical pressure change data, and the pseudo data information, an output of the feature extracting layer includes a pressure change feature, and the forward prediction step size is a time interval between future time points for sampling; an input of the pressure layer includes the pressure change feature, the operating data, and the physical and chemical parameters, and an output of the pressure layer includes the at least one set of pressure change data at the at least one future time point; and determining a pressure adjusting time point and preparing for a pressure adjustment based on the at least one set of pressure change data at the at least one future time point.

2. The method according to claim 1, wherein the operation data at least includes thermal conductivity, an environment temperature, and a storage temperature, the method further comprising:

in response to a change in a quality of the LNG, determining a changed storage temperature based on the operating data and the physical and chemical parameters.

3. The method according to claim 1, wherein the physical and chemical parameters at least include a type, a pressure, and a quality of the LNG at a plurality of consecutive time points.

4. The method according to claim 1, wherein the at least one future time point is determined by a process including:

determining a pseudo data feature based on the pseudo data information; and determining a count of the at least one future time point and the forward prediction step size based on the pseudo data feature.

5. The method according to claim 4, wherein the forward prediction step size is determined by a process including:

determining a post-update forward prediction step size of the at least one future time point through processing a pre-update forward prediction step size of the at least one future time point and a pseudo data sequence feature vector by an adjusting model, wherein the pseudo data sequence feature vector is determined based on the pseudo data feature, the forward prediction step size does not exceed a preset lower limit, and the preset lower limit is determined based on an anomaly processing response time.

6. The method according to claim 1, wherein the determining a pressure adjusting time point based on the at least one set of pressure change data at the at least one future time point includes:

determining a candidate time point when the at least one set of pressure change data reaches a preset pressure threshold based on the at least one set of pressure change data at the at least one future time point; and determining the pressure adjusting time point based on the candidate time point and a pseudo data feature.

7. The method according to claim 6, wherein the determining the pressure adjusting time point based on the candidate time point and a pseudo data feature includes:

determining the pressure adjusting time point through revising the candidate time point based on a pseudo data feature coefficient, wherein the pseudo data feature coefficient is determined based on the pseudo data feature.

8. The method according to claim 1, further comprising:

obtaining actual pressure change data; and performing a failure analysis on the LNG storage device based on the actual pressure change data and the at least one set of pressure change data at the at least one future time point.

9. The method according to claim 8, wherein the performing a failure analysis on the LNG storage device based on the actual pressure change data and the at least one set of pressure change data at the at least one future time point includes:

obtaining a difference distribution time point based on the actual pressure change data and the at least one set of pressure change data at the at least one future time point;

obtaining a pseudo data distribution time point based on a pseudo data feature;

determining a similarity based on the difference distribution time point and the pseudo data distribution time point; and determining a failure type based on the actual pressure change data, the at least one set of pressure change data at the at least one future time point, and the similarity.

10. The method according to claim 1, further comprising:

monitoring, by utilizing a data acquiring unit, the LNG storage device, perceiving and acquiring pressure, temperature, and position data on the LNG storage device, obtaining encrypted perception information through performing an analog-to-digital conversion on perception information by the data acquiring unit and symmetrically encrypting the perception information by adopting a microsoft point-to-point encryption (MPPE) and Internet Protocol Security (IPSec) mechanism in a binary mode, and managing a key by a public-private key verification; actively sending, by the data acquiring unit, authentication information to the LNG distributed energy management platform at a designated address through an LNG distributed energy storage sensor network platform, after passing a two-way symmetric authentication, establishing a unique communication channel between the data-acquiring unit and the LNG distributed energy management platform to transmit the encrypted perception information;

decrypting, by the LNG distributed energy management platform, the encrypted perception information, performing an anomaly judgment on decrypted perception information according to a preset anomaly judgment condition, and screening out abnormal perception information; performing a pseudo data verification on the abnormal perception information utilizing a pseudo data verification manner, identifying and labeling a type of pseudo data caused by an external environmental interference; performing an anomaly prediction analysis on the operating data of the LNG storage device according to an early warning mechanism;

sending, by an LNG distributed energy storage maintenance personnel sensor network platform, an alarm prompt to field maintenance personnel for an inspection and processing according to a tank identifier of the LNG storage device corresponding to abnormal data obtained by the anomaly prediction analysis and the anomaly judgment; and sending, by the field maintenance personnel, processing information to the LNG distributed energy management platform through the LNG distributed energy storage maintenance personnel sensor network after completing the inspection and processing, and confirming, by the LNG distributed energy management platform, whether the processing is completed; obtaining, by the LNG distributed energy management platform, processed tank perception information through the LNG distributed energy storage sensor network platform and confirming that the field maintenance personnel completes the processing if a status of the processed tank perception information is determined to not be the abnormal perception information, and feeding back to the field maintenance personnel.

11. The method according to claim 10, wherein the performing an anomaly prediction analysis on the operating data of the LNG storage device according to an early warning mechanism includes:

data preprocessing: adopting a Holt double-parameter linear exponential smoothing manner to smooth the decrypted perception information to obtain a monitoring time series $x_t$;

model initialization: an initialization model order p=1, a forward predicted step size $np=np_0$;

model establishment: establishing an initial auto-regression moving average (ARMA) model based on the monitoring time series $x_t$;

determining a length of a modeling sample: determining an integer multiple of an inverse of an interval between two adjacent frequencies in a temporal frequency domain of the perception information as the length of the modeling sample through time series analysis;

estimating model parameter: estimating the model parameter by utilizing a least square manner;

inspecting the model and determining an order: determining a machine order p of a parameter change trend predicting model to obtain a final parameter trend predicting model ARMA (2p, 2p-1) by adopting an Akaike information criterion (AIC);

predicting parameter: obtaining a prediction interval by calculating a continuous forward predicted step size np; and analyzing the abnormal data: obtaining an operating prediction result of the LNG storage device through calculating a best prediction result and a corresponding prediction interval corresponding to the best prediction result by adopting a dynamically correcting ARMA prediction manner, and determining whether the operating prediction result is the abnormal data according to the preset anomaly judgment condition, wherein the preset anomaly judgment condition includes the operating prediction result of the LNG storage device exceeding a set pressure and temperature.

12. The method according to claim 10, wherein the performing a pseudo data verification on the abnormal perception information by utilizing a pseudo data verification manner and identifying and labeling a type of pseudo data caused by an external environmental interference includes:

establishing the pseudo data verification manner, setting an error code in a sensor program of the data acquiring unit to simulate a sensor value during a real electromagnetic interference for pseudo data generated by an electromagnetic interference in a field maintenance process in advance, and setting an anomaly analysis result of the LNG distributed energy management platform as pseudo data of the electromagnetic interference;

for pseudo data generated by failure of a transmission line or device failure, randomly creating a sensor or transmission line failure, and setting the anomaly analysis result labeled by the LNG distributed energy management platform as pseudo data of the sensor or transmission line; and performing a pseudo data analysis on the abnormal perception information, and labeling a corresponding type of pseudo data by utilizing the pseudo data verification manner.

13. The method according to claim 11, wherein the data preprocessing includes:

processing the abnormal perception data, forming the monitoring time series $\{x_t, t=1, 2, \ldots, N\}$ for perceived and acquired operating data of the LNG storage device, and for abnormal monitoring data being zero, calculating a one-step smoothing value $F_t$ of first $N_x$ numbers by monitoring the first $N_x$ numbers in the monitoring time series to replace the abnormal monitoring data, and selecting actual monitoring operating data to obtain a length $N_x$ of the monitoring time series used for a smoothing calculation;

processing missing data, for a missing sequence $\{x_t, t=1, 2 \ldots \}$ formed by original monitoring data, firstly obtaining the length $N_x$ of the monitoring time series of the original data required for the smoothing calculation according to an actual monitoring operating data analysis; and setting a count of smoothing steps m, and for gas concentration monitoring values $\{x_t, t=1, 2, \ldots, N_x\}$ of the first $N_x$ points of missing data points, continuously performing the smoothing calculation of m steps to obtain a final smoothed value $F_{t+m}$, and finally inserting the final smoothed value $F_{t+m}$ into the missing sequence to form a complete monitoring data time series.

14. The method according to claim 11, wherein the dynamically correcting ARMA prediction manner includes:

evaluating a predicted error, for previous j-1 predictions, calculating an average value of prediction errors of previous n predictions, and obtaining an error minimum value and an error subminimum value;

determining an effective model order, determining model orders $p_1$ and $p_2$ when the error minimum value and the error subminimum value are obtained as effective model orders of the previous j-1 predictions;

modeling with current data, for an analysis sequence formed by operating monitoring data of the current LNG storage device, obtaining an optimal order $p_0$ through the ARMA model for parameter estimation and validity inspection;

a predicting model, taking $p=p_0$, $p_1$, $p_2$ as an order respectively to perform an operating data parameter prediction, and obtaining prediction results $X=[x_{j1}, x_{j2}, x_{j3}]$; and calculating the best prediction result, calculating an average value of each element of $X=[x_{j1}, x_{j2}, x_{j3}]$ to obtain a final prediction result as the best prediction result.

15. A non-transitory computer readable storage medium storing a set of instructions, when executed by at least one processor, causing the at least one processor to perform the method for monitoring operation of liquefied natural gas (LNG) storage of claim 1.

16. An Internet of Things (IoT) system for monitoring operation of liquefied natural gas (LNG) storage, which is realized by using a method for monitoring operation of LNG storage, wherein the IoT system includes an object platform, a sensor network platform, a management platform, a service platform, and a user platform;

the object platform includes an LNG distributed energy storage object platform and an LNG distributed energy storage maintenance personnel object platform; the LNG distributed energy storage object platform is configured to monitor and perceive operating data of an LNG storage device, physical and chemical parameters of LNG, and historical pressure change data in the LNG storage device, and transmit perception information, the physical and chemical parameters, and the historical pressure change data after symmetric encryption to an LNG distributed energy management platform through the sensor network platform; and the LNG distributed energy storage maintenance personnel object platform is configured for field maintenance personnel to receive an alarm prompt and feedback on maintenance processing;

the sensor network platform includes an LNG distributed energy storage sensor network platform and an LNG distributed energy storage maintenance personnel sensor network platform, which are configured to realize a communication connection for perception and control between the management platform and the object platform;

the management platform is configured to acquire the operating data, the physical and chemical parameters, and the historical pressure change data, determine pseudo data information based on the historical pressure change data, determine at least one set of pressure change data at at least one future time point through a pressure model based on the operating data, the physical and chemical parameters, the historical pressure change data, and the pseudo data information, wherein the pressure model is a machine learning model, the pressure model includes a feature extracting layer and a pressure layer, wherein an input of the feature extracting layer includes a forward prediction step size, the historical pressure change data, and the pseudo data information, an output of the feature extracting layer includes a pressure change feature, and the forward prediction step size is a time interval between future time points for sampling; an input of the pressure layer includes the pressure change feature, the operating data, and the physical and chemical parameters, and an output of the pressure layer includes the at least one set of pressure change data at the at least one future time point, and determining a pressure adjusting time point and preparing for a pressure adjustment based on the at least one set of pressure change data at the at least one future time point, send an alarm prompt to field maintenance personnel for an inspection and processing according to a tank identifier of the LNG storage device corresponding to abnormal data obtained by an anomaly prediction analysis and an anomaly judgment through the sensor network platform, wherein the abnormal data is identified when an operating prediction result of the LNG storage device exceeds a set pressure and temperature;

the service platform is configured to obtain the perception information demanded by a user from the management platform for analysis and storage, and receive control information sent by the user for processing and send processed control information to the management platform;

the user platform is configured to obtain the operating data of the LNG storage device from the service platform for various users and send the control information to the service platform;

the service platform is further configured to acquire the operating data, the physical and chemical parameters, the historical pressure change data, the at least one set of pressure change data, the pressure adjusting time point demanded by a user from the management platform for analysis and storage, and receive control information sent by the user for processing and send processed control information to the management platform; and the user platform is further configured to obtain the operating data from the service platform, the physical and chemical parameters, the at least one set of pressure change data, the pressure adjusting time point for the user and send the control information to the service platform.

17. The Internet of Things (IoT) system according to claim 16, wherein the management platform is further configured to:

determine a pseudo data feature based on the pseudo data information; and determine a count of the at least one future time point and the forward prediction step size based on the pseudo data feature.

18. The Internet of Things (IoT) system according to claim 17, wherein the management platform is further configured to:

determine a post-update forward prediction step size of the at least one future time point through processing a pre-update forward prediction step size of the at least one future time point and a pseudo data sequence feature vector by an adjusting model, wherein the pseudo data sequence feature vector is determined based on the pseudo data feature, the forward prediction step size does not exceed a preset lower limit, and the preset lower limit is determined based on an anomaly processing response time.

19. The Internet of Things (IoT) system according to claim 16, wherein the management platform is further configured to:

determine a candidate time point when the at least one set of pressure change data reaches a preset pressure threshold based on the at least one set of pressure change data at the at least one future time point; and determine the pressure adjusting time point based on the candidate time point and a pseudo data feature.

20. The Internet of Things (IoT) system according to claim 16, wherein the management platform is further configured to:

obtain actual pressure change data; and perform a failure analysis on the LNG storage device based on the actual pressure change data and the at least one set of pressure change data at the at least one future time point.

* * * * *